March 2, 1971　　V. D. KAPTUR, JR., ET AL　　3,567,274
DUAL-ACTION TAILGATE

Filed July 28, 1969　　2 Sheets-Sheet 1

INVENTORS
Vincent D. Kaptur, Jr.
David D. Campbell
BY
D. L. Ellis
ATTORNEY

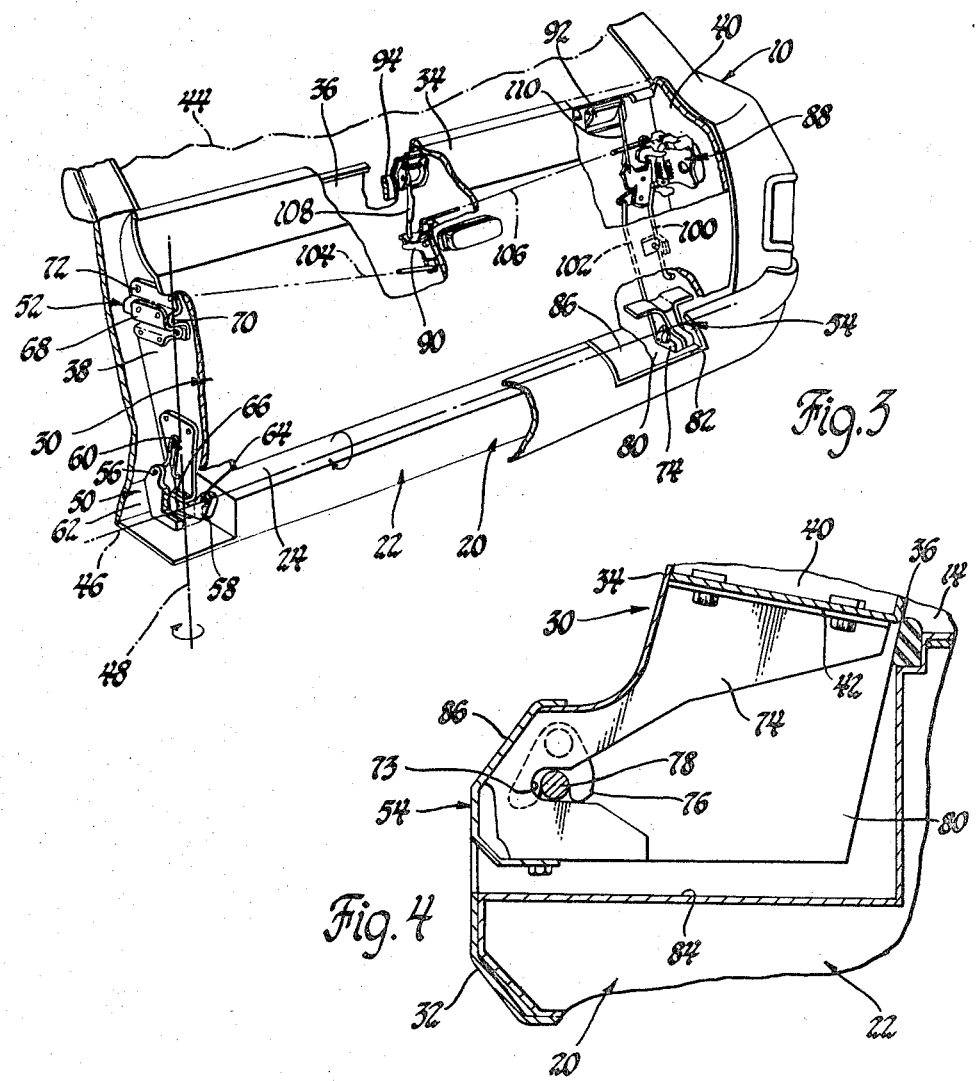
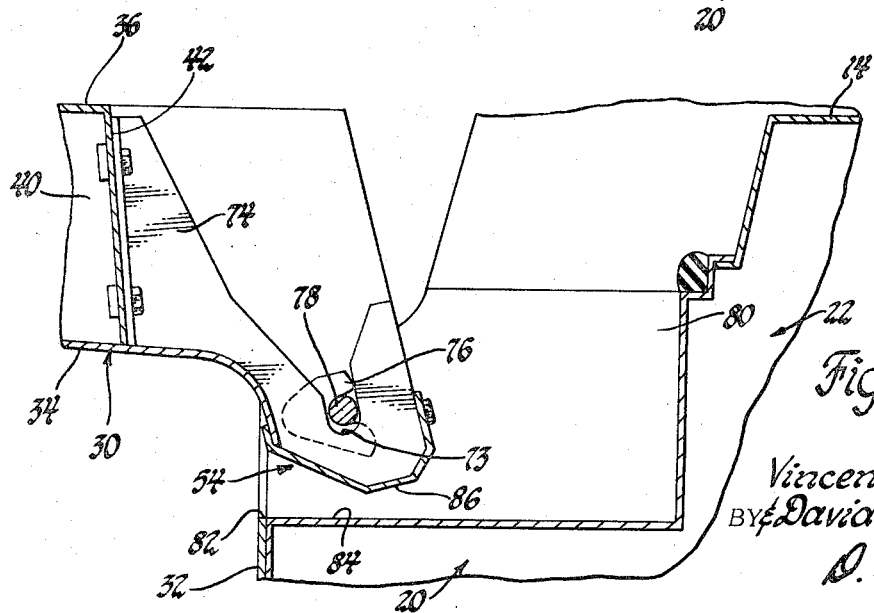

United States Patent Office 3,567,274
Patented Mar. 2, 1971

3,567,274
DUAL-ACTION TAILGATE
Vincent D. Kaptur, Jr., and David D. Campbell, Bloomfield Hills, Mich., assignors to General Motors Corporation, Detroit, Mich.
Filed July 28, 1969, Ser. No. 845,244
Int. Cl. B60j 5/10
U.S. Cl. 296—50
3 Claims

ABSTRACT OF THE DISCLOSURE

A station wagon type vehicle has a dual-action tailgate swingable thereon between open and closed positions either as a door about a generally vertical axis situated at one side of the tailgate opening or as a drop-gate about a generally horizontal axis situated below the tailgate opening, and has a rear bumper structure immediately below the tailgate opening and extending vertically through the horizontal plane of the horizontal swinging axis. The bumper structure includes a narrow notch formed therein to receive in the closed position of the tailgate a portion of a hinge-latch depending from the tailgate below the opening, the notch further providing a step tread in the bumper structure facilitating passenger ingress and egress.

---

This invention relates generally to station wagons having tailgates of the dual-action variety wherein the tailgate is mounted on the vehicle for swinging movement relative to the tailgate opening as a door or as a drop-gate.

In all station wagons, for maximum convenience, the floor of the station wagon rear compartment and the inner panel of the tailgate should lie substantially in the same horizontal plane when the tailgate is swung to open position as a drop-gate. Further, for maximum collision protection, the rear impact bumper bar should be at a height above ground level which is generally the same as the bumper height of other vehicles. In station wagons having conventional drop-gates only, the relation between the compartment floor level and bumper bar height does not pose a problem because, should the vehicle design dictate a horizontal pivot axis below the upper marginal edge of the bumper bar, it is simply a matter of employing gooseneck or similar hinges between the vehicle and the tailgate so that the latter may swing over the upper marginal edge of the bumper bar.

In station wagons having dual-action tailgates, the problem of the relation between bumper bar height and compartment floor level becomes pronounced. If it is desired that the horizontal pivot axis be situated below the upper marginal edge of the bumper bar, drop-gate operation could be accommodated by such suitable hinges, but during operation of the tailgate as a door one of the hinges on this horizontal axis must serve as a latch which is separable to allow swinging movement of the tailgate in horizontal planes and accordingly provision must be made for avoiding interference in these planes between the bumper bar and separated hingle-latch during tailgate movement as a door.

Prior art station wagons with dual-action tailgates have simply avoided the problem by placing the horizontal pivot axis above the upper marginal edge of the bumper bar so that the tailgate and separated hinge-latch move above the bumper bar during operation in the door mode. This can involve a sacrifice in either or both of two important areas. If the height of the bumper is maintained at the usual desired level, raising the horizontal pivot axis thereabove raises the level of the inner panel of the tailgate when the latter is swung open as a drop-gate and can result in either a disparity between the compartment floor level and tailgate inner panel level or an undesirably high compartment floor level. Conversely, if the most advantageous floor and lowered drop-gate level is to be maintained, the necessarily low horizontal pivot axis requires a lowering of the upper marginal edge of the bumper bar to accommodate door operation, thus sacrificing valuable impact protection and/or ground clearance.

It is the primary object of this invention to provide a mounting arrangement for a dual-action tailgate wherein both the compartment floor level and the rear impact bumper-bar height are optimal and experience no sacrifice because of the dual swinging nature of the tailgate.

A feature of this invention is that it provides an improved mounting arrangement for station wagon tailgates of the dual-action variety wherein the horizontal tailgate pivot axis is situated below the upper marginal edge of the bumper bar of the rear bumper structure of the vehicle. Another feature of this invention resides in the provision in the vehicle bumper structure of means permitting access for the separable hinge-latch of the tailgate to the horizontal tailgate pivot axis through the bumper structure. Yet another feature of this invention is that it provides a dual-action station wagon tailgate mounting arrangement including a narrow notch in the rear bumper structure on the vehicle which notch in an outwardly swung position of the tailgate is exposed to form a step between the rear compartment and ground level and which in the closed position of the tailgate is concealed by a decorative portion of the hinge-latch structure of the tailgate. These and other features of this invention will be readily apparent from the following specification and from the drawings wherein:

FIG. 3 is a partially broken away perspective view similar to FIG. 1;

FIG. 4 is a sectional view taken geenrally along the plane indicated by lines 4—4 in FIG. 1; and FIG. 5 is similar to FIG. 4 but showing the tailgate in the opened position of the drop-gate mode thereof.

Figure 1:
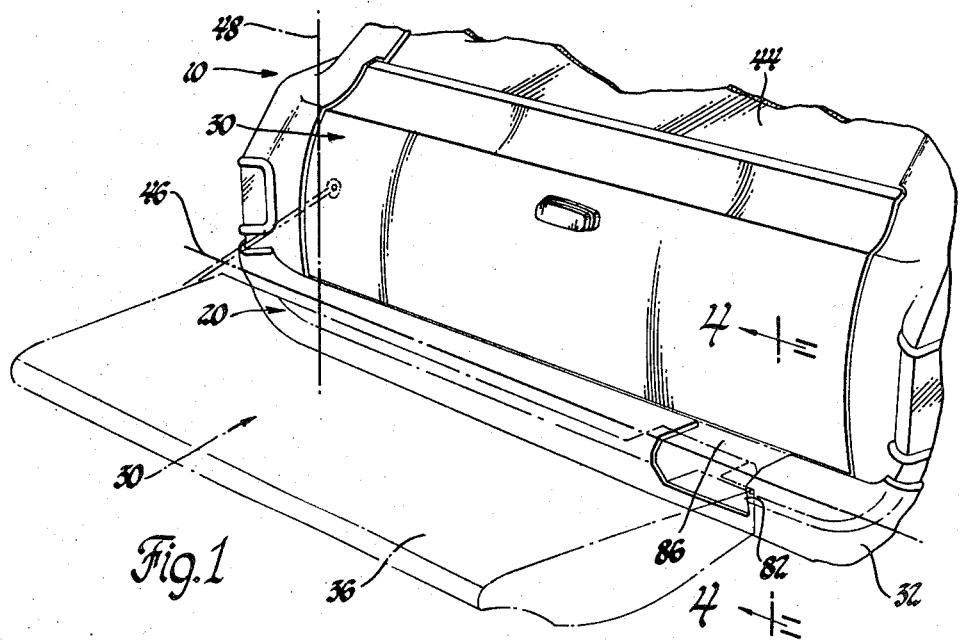
FIG. 1 is a fragmentary perspective view of the rear portion of a station wagon type vehicle having a dual-action tailgate mounting arrangement according to this invention and showing the raised and lowered positions of the drop-gate mode of the tailgate in solid and broken lines respectively.
Figure 2:
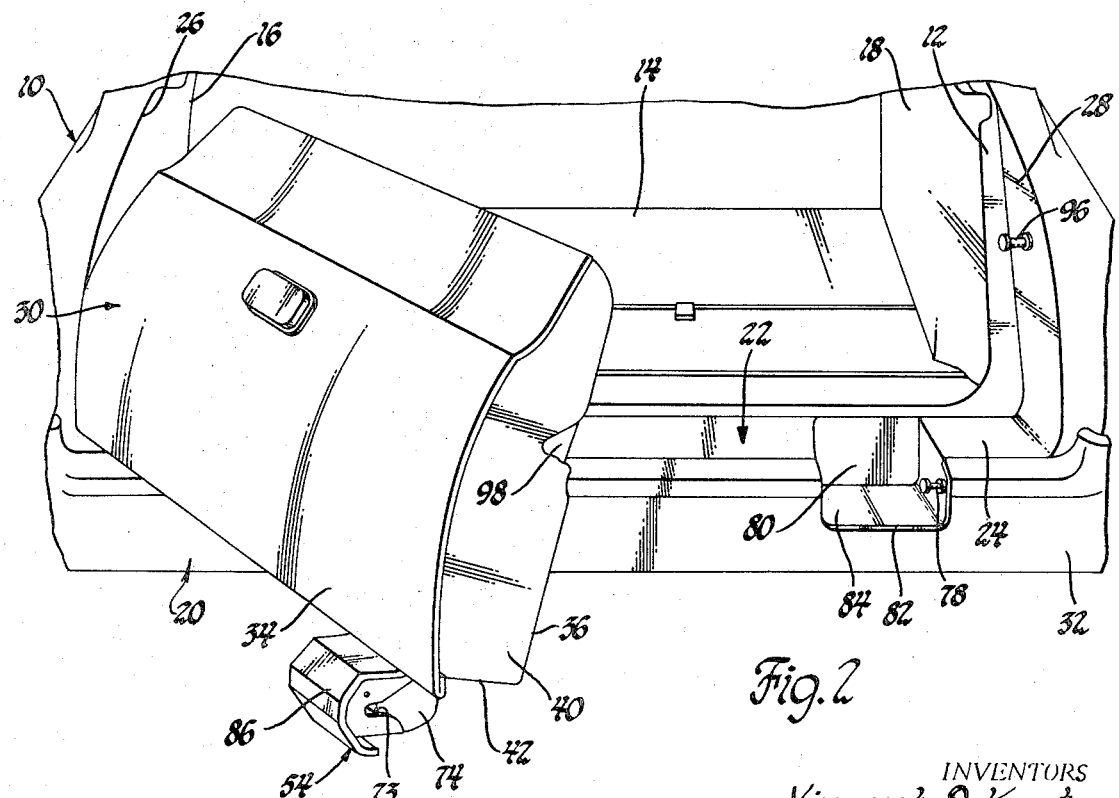
FIG. 2 is a perspective view showing the dual-action tailgate in the opened position of the door mode thereof.

Referring now to FIGS. 1 and 2 of the drawings, a station wagon type vehicle body 10 has a rear compartment and a rear opening 12 thereto. The rear compartment has a floor panel assembly 14 and a pair of interior trim side panels 16 and 18, which floor and side panels terminate at their rearward extremities at rear opening 12. A rear bumper structure generally designated as 20 is mounted on body 10 below and rearwardly of the opening 12 and includes a generally horizontal sill panel assembly 22 extending laterally between the opposite rear quarters of the body. The sill includes a horizontal panel 24 joined with a pair of vertical jamb panels 26, 28 to provide a mounting frame for a dual-action tailgate 30. A collision bumper bar 32 of conventional decorative nature is suitably mounted to body 10 and overlies the sill assembly 22, the bumper bar being substantially curved in cross section as shown in FIG. 4.

A tailgate 30 has an outer panel 34 and an inner panel 36 joined in spaced relationship by side panels 38 and 40 and by a generally horizontal lower wall 42. In the closed position thereof, FIGS. 1 and 3, the tailgate is situated within the mounting frame provided in the body with the lower wall 42 of the tailgate overlying sill panel 24 and with side panels 38 and 40 lying adjacent and generally parallel to jamb panels 26 and 28 respectively. A window panel 44 is mounted on the tailgate and is movable by a conventional manual or power operated window regulator, not shown, between a raised position relative to the tailgate for closing the upper portion of the rear opening 12 in the closed position of the tailgate, and a lowered position relative to the tailgate wherein the window is housed within the tailgate between outer and inner panels 34 and 36. The configuration of outer panel 34 is such that in the closed position of the tailgate, FIG. 1, continuity of appearance is maintained across the lower portion of the rear of the vehicle.

The tailgate is pivotally mounted on the vehicle by means to be generally described hereinafter for swinging movement as a drop-gate between the closed position and a downwardly swung first open position, FIG. 1, about a generally horizontal axis 46, and between the closed position and a laterally outwardly swung second open position, FIG. 2, about a generally vertical axis 48 situated at one side of opening 12. The bumper bar 32 is mounted on the body 10 to extend vertically through the horizontal plane of axis 46, enveloping the rear facing position of sill assembly 22 and extending around the vehicle on either side of the rear opening so that the horizontal axis 46 lies forwardly of the bumper bar and is enclosed thereby.

As shown best in FIG. 3, a three-point arrangement is employed to mount the tailgate on the vehicle for swinging movement about either of the two axes 46 and 48 and includes a biaxial multihinge 50 at the lower left corner of the tailgate and a pair of hinge-latches 52 and 54. The biaxial hinge 50 and the hinge-latch 52 provide a pair of hinge joints between the body 10 and the tailgate for swinging movement of the latter as a door about axis 48 upon release of hinge-latch 54, while the biaxial hinge and the hinge-latch 54 provide a pair of hinge joints for swinging movement of the tailgate as a drop-gate about the axis 46 upon release of hinge-latch 52.

Reference may be had to copending application of Sandor, Ser. No. 845,422, filed July 28, 1969, assigned to the assignee of the present invention, for a detailed description of the biaxial hinge and the hinge-latches. Generally, biaxial hinge 50 includes a stationary hinge plate 56, a generally L-shaped intermediate arm 58 and a tailgate mounted hinge plate 60. The stationary hinge plate 56 is fixedly secured to the body 10 within recess 62 at the left side of sill assembly 22. The intermediate arm 58 is journaled by a hinge pintle at 64 on a portion, indicated in broken lines in FIG. 3, of the stationary hinge plate 56 extending along the horizontal axis 46 while the other end thereof is pivotally connected to the tailgate hinge plate 60 by a hinge plate pintle at 66. For drop-gate operation, the hinge plate 60 and intermediate arm 58 rotate as a unit with the tailgate about the extension of the stationary hinge plate and horizontal axis 46. In the closed position of the tailgate, FIGS. 1 and 3, the intermediate arm 58 lies wholly within the recess 62 with the pivotal connection 66 lying on vertical axis 48. For tailgate operation as a door, intermediate arm 58 remains stationary and the hinge plate 60 and tailgate rotate about vertical axis 48 at 66.

The hinge-latch 52 includes a stationary plate 68 secured to the upper portion of sidewall 26 having mounted thereon a striker pin 70 oriented vertically along axis 48, and further includes a latch housing 72 secured to the upper portion of the tailgate side panel 38 having mounted therein a latch arrangement, not shown. In the closed position of the tailgate, the latch housing 72 envelopes the striker pin while the latch arrangement therein engages the pin to prevent outward swinging movement of the housing 72 and the tailgate relative to the stationary plate 68 and the vehicle body about axis 46. However, the housing 72 and attached tailgate are rotatable relative to the striker pin so that when the latch arrangement engages the striker pin, a pivotal connection between the vehicle and tailgate is provided for swinging movement of the latter about vertical axis 48. When drop-gate operation of the tailgate is desired, the latch arrangement in the latch housing 72 is actuable to release from the striker pin 70, thereby permitting separation of latch housing 72 from stationary plate 68 and subsequent outward swinging movement of the tailgate about horizontal axis 46.

Referring to FIGS. 3 through 5, the hinge-latch 54 includes a generally L-shaped support frame 74 depending from the tailgate lower wall 42 and having therein a latch arrangement with a fork type latch bolt 76, and further includes a striker pin 78 mounted in a generally rectangular notch 80 at the right end of sill assembly 22 and disposed along horizontal axis 46, FIG. 2. In the closed position of the tailgate, mouth portion 73 of depending support frame 74 envelops striker pin 78, the frame lying generally within the notch 80 and the tailgate and support frame being retained against outward swinging movement about axis 48 by engagement between the latch bolt 76 and striker pin 78, FIG. 4. The support frame 74 and latch bolt therein are rotatable about striker pin 78 and, for drop-gate operation, pivot as a unit with the tailgate about the striker pin and horizontal axis 46. For operation of the tailgate as a door, the hinge-latch 54 is actuable as will be described to release the striker pin 78, permitting separation of the support frame 74 from the pin and outward swinging movement of the tailgate as a door about vertical axis 48.

The upper marginal edge of the bumper bar extends generally to the level of sill panel 24, which level is of course spaced below the lower wall 42 of the tailgate so that door movement thereof is not restricted. To accommodate outward movement of the depending support frame 74 during door movement, a notch 82 is formed in the rear bumper bar 32 in registry with notch 80. The notch 82 is of width generally equal to that of the notch 80, which width is purposely maintained relatively small as compared to the entire width of the bumper structure so that the structural integrity of the bumper bar is substantially maintained, but of sufficient width to permit passage therethrough of support frame 74 during door operation of the tailgate.

In the preferred embodiment, the notches 80 and 82 register to form a single notch in the bumper structure having a horizontal step surface 84. In the door open position, FIG. 2, the notch in the bumper structure is exposed and the horizontal step surface 84 is at a level between the compartment floor level and ground level, thereby forming a convenient step which facilitates passenger movement to and from the rear compartment.

A bumper segment 86 of width generally equal to that of the notch 82 in the bumper bar is fixedly secured to the exterior of the depending support frame 74 and has a configuration similar to that of the bumper bar adjacent the notch so that in the closed position of the tailgate the bumper segment conceals the notch and provides continuity of appearance thereacross, FIGS. 1, 3 and 4. When the tailgate and support frame are pivoted about the horizontal axis 46, the bumper segment pivots therewith into the clearance space between the striker pin 78 and the step surface 84, FIG. 5.

The copending application of Sandor, Ser. No. 845,422, provides detailed description of the tailgate operating arrangement within the tailgate structure, but generally it includes a main latch assembly 88, a bellcrank assembly 90, a door handle assembly 92 and a drop-gate handle assembly 94. The main latch 88 includes a latch bolt, not shown, which functions to releasably engage a striker pin 96 on jamb panel 28 which protrudes into the main latch assembly through aperture 98 in the tailgate side panel 40, FIG. 2, when the tailgate is moved to closed position. The main latch further includes a detenting mechanism, not shown, which is rigidly and operatively connected to the latch arrangement in the support frame 74 by a link 102 and is rigidly connected to the latch arrangement in the latch housing 72 by links 104 and 106 through the bellcrank 90. The bellcrank is operatively connected to the drop-gate handle 94 by a link 108 while the door handle 92 is operatively connected to the main latch detenting mechanism by a cable 110, FIG. 3.

When door operation is desired, the door handle 92 is grasped and swung upwardly to actuate the detent mechanism in the main latch assembly through the cable 110, which actuation causes release of the striker pin 96 from the latch bolt therein. Simultaneously, movement of the detent mechanism is transmitted through link 102 to the latch arrangement in the support frame 74, which movement causes the latch bolt 76 to release the striker pin 78 in the notch 80. With the right edge thereof free, the tailgate may be swung outward about vertical axis 48 in which outwardly swung position the notch in the bumper structure 20 is exposed to facilitate movement to and from the rear compartment.

When operation of the tailgate from the closed position thereof as a drop-gate is desired, the drop-gate handle 94 is grasped and swung upwardly causing link 108 to rotate the bellcrank 90 and shift the links 104 and 106 in a direction causing actuation of the detent mechanism in the main latch assembly for release thereof simultaneously with releasing actuation of the latch arrangement in latch housing 72. With the upper edge thereof free, the tailgate may be swung outward as a drop-gate about horizontal axis 46 to the horizontal position shown in broken lines in FIG. 1.

Having thus described the invention what is claimed is:

1. In a station wagon vehicle body having a rear compartment and a rear opening to said compartment, a tailgate adapted to close said opening, means mounting said tailgate on the body for swinging movement between open and closed positions relative to said rear opening either as a drop-gate swingable about a generally horizontal axis of said body or as a door swingable about a generally vertical axis of said body located adjacent one side of said opening, bumper structure on said body below said rear opening and having a top marginal edge portion thereof disposed generally at the lower margin of said opening, said mounting means including a hinge-latch adjacent the side of said opening opposite said vertical axis and having latch and striker portions, one of said portions including a support frame structure on said tailgate depending from the lower edge thereof to extend substantially below the lower margin of said opening in the closed position of said tailgate and being of substantially narrow width relative to the width of said tailgate, and means in said bumper structure defining a notch therein extending substantially below the top marginal edge thereof and of a width complementary to the width of said frame structure to closely receive the same during movement of the tailgate about said vertical axis between the open and the closed positions thereof, the other of said hinge-latch portions including an element thereof mounted on said body and disposed within said notch below the lower margin of said opening and defining said horizontal swinging axis of said tailgate, said support frame structure being swingable with said tailgate as a unit within said notch when said tailgate is swung as a drop-gate about said axis between open and closed positions and being swingable as a unit with said tailgate into and out of said notch when said tailgate is swung as a door about said vertical axis between open and closed positions.

2. In a station wagon vehicle body having a rear compartment and a rear opening to said compartment, a tailgate adapted to close said opening, means mounting said tailgate on the body for swinging movement between open and closed positions relative to said rear opening either as a drop-gate swingable about a generally horizontal axis of said body or as a door swingable about a generally vertical axis of said body located adjacent one side of said opening, bumper structure on said body below said rear opening and having a top marginal edge portion thereof disposed generally at the lower margin of said rear opening, said mounting means including a hinge-latch adjacent the side of said rear opening opposite said vertical axis and having latch and striker portions, one of said portions including a support frame structure on said tailgate depending from the lower edge thereof to extend substantially below the lower margin of said rear opening and being of substantially narrow width relative to the width of said tailgate, means in said bumper structure defining a notch therein of narrow width relative to the width of said tailgate and extending substantially below the top marginal edge of said bumper structure to receive said frame structure in the closed position of the tailgate, and means on said bumper structure defining a step surface at said notch generally the width thereof for facilitating passenger movement into and out of said compartment, the other of said hinge-latch portions including an element thereof mounted on said body within said notch below the lower margin of said opening and defining said horizontal swinging axis of said tailgate, said support frame structure being swingable as a unit about said horizontal axis within said notch when said tailgate is swung as a drop-gate about said horizontal axis between open and closed positions and being swingable as a unit with said tailgate during swinging movement of the latter about said vertical axis from a position within said notch in the closed position of said tailgate, said step surface being concealed in the closed position of said tailgate and when the latter is opened about said vertical axis being exposed to provide a step between said rear compartment and ground level.

3. In a station wagon vehicle body having a rear compartment and a rear opening to said compartment, a tailgate adapted to close said opening, means mounting said tailgate on said body for swinging movement between open and closed positions relative to said rear opening either as a drop-gate swingable about a generally horizontal axis of said body or as a door swingable about a generally vertical axis of said body below said rear opening and having a top marginal edge portion thereof disposed generally at the lower margin of said rear opening, said mounting means including a hinge-latch adjacent the side of said opening opposite said vertical axis and including a latch portion and a striker, said latch portion including a support frame structure on said tailgate depending from the lower edge thereof to extend substantially below the lower margin of said opening in the closed position of said tailgate and being of substantially narrow width relative to the width of said tailgate and having therein a selectively releasable latch bolt arrangement, means in said bumper structure defining a notch therein of substantially narrow width relative to the width of said tailgate and extending substantially below the top marginal edge of said bumper structure to receive said support frame structure in the closed position of said tailgate, said bumper structure having within said notch a horizontal step surface, said striker being mounted on said body within said notch below the lower margin of said opening and defining said horizontal swinging axis, and a bumper segment fixedly secured to said support frame structure and being of width generally equal to the width of said notch, said bumper segment substantially concealing said notch in the closed position of said tailgate, and being swingable as a unit with said support frame and said tailgate about said striker pin within said notch when said tailgate is swung as a drop-gate about said horizontal axis between open and closed positions, said support frame and said bumper segment being swingable with said tailgate when the latter is swung to open position to expose said surface.

References Cited

UNITED STATES PATENTS

| | | | |
|---|---|---|---|
| 3,387,406 | 6/1968 | Coker et al. | 49—192 |
| 3,400,961 | 9/1968 | Koch et al. | 296—50X |
| 3,408,100 | 10/1968 | Mckey | 292—216 |
| 3,454,299 | 7/1969 | Hewitt et al. | 296—50 |

LEO FRIAGLIA, Primary Examiner

L. J. PAPERNER, Assistant Examiner

U.S. Cl. X.R.

16—147; 49—192; 296—57